(12) United States Patent
Villaume et al.

(10) Patent No.: US 8,095,300 B2
(45) Date of Patent: Jan. 10, 2012

(54) METHOD AND DEVICE FOR GENERATING A SPEED PROFILE FOR AN AIRCRAFT DURING A TAXIING

(75) Inventors: Fabrice Villaume, Seysses (FR); Pierre Scacchi, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 361 days.

(21) Appl. No.: 12/330,407

(22) Filed: Dec. 8, 2008

(65) Prior Publication Data

US 2009/0150011 A1    Jun. 11, 2009

(30) Foreign Application Priority Data

Dec. 11, 2007    (FR) ...................................... 07 08598

(51) Int. Cl.
*G05D 3/00* (2006.01)
*G06F 7/00* (2006.01)
*G06F 17/00* (2006.01)
*B60L 3/00* (2006.01)
*B60L 15/00* (2006.01)

(52) U.S. Cl. ............... 701/121; 701/3; 701/70; 244/182; 244/191; 244/195; 244/230

(58) Field of Classification Search ................ 701/3, 16, 701/70, 121; 244/182, 191, 195, 230
See application file for complete search history.

(56) References Cited

U.S. PATENT DOCUMENTS

| | | | |
|---|---|---|---|
| 6,652,233 B2 * | 11/2003 | Otake | 416/30 |
| 7,014,146 B2 * | 3/2006 | Villaume et al. | 244/111 |
| 7,343,229 B1 * | 3/2008 | Wilson | 701/15 |
| 7,437,225 B1 * | 10/2008 | Rathinam | 701/14 |
| 7,717,527 B1 * | 5/2010 | Griffith | 303/126 |
| 7,772,992 B2 * | 8/2010 | Fetzmann et al. | 340/961 |
| 7,818,099 B2 * | 10/2010 | Kemp | 701/3 |
| 2007/0208466 A1 * | 9/2007 | Meunier | 701/16 |
| 2007/0271019 A1 * | 11/2007 | Dellac et al. | 701/70 |
| 2009/0018713 A1 * | 1/2009 | Coulmeau et al. | 701/3 |
| 2010/0131124 A1 * | 5/2010 | Klooster | 701/3 |
| 2010/0299004 A1 * | 11/2010 | Hugues | 701/16 |
| 2010/0299005 A1 * | 11/2010 | Hugues | 701/16 |

FOREIGN PATENT DOCUMENTS

| | | |
|---|---|---|
| DE | 43 04 562 | 8/1994 |
| EP | 1 834 875 | 9/2007 |
| FR | 2 895 726 | 7/2007 |

OTHER PUBLICATIONS

Preliminary Search Report dated Jun. 16, 2008 w/ English translation.

* cited by examiner

*Primary Examiner* — Jack Keith
*Assistant Examiner* — Rami Khatib
(74) *Attorney, Agent, or Firm* — Dickinson Wright PLLC

(57) ABSTRACT

A method and device for generating a speed profile for an aircraft rolling on the ground.

The device (1) comprises means (8) for automatically determining a speed profile which is suited to successive elements of a ground rolling trajectory and which complies with maximum speeds and particular constraints.

11 Claims, 6 Drawing Sheets

METHOD AND DEVICE FOR GENERATING A SPEED PROFILE FOR AN AIRCRAFT DURING A TAXIING

The present invention relates to a method and a device for generating a speed profile of an aircraft, which is associated with a ground rolling trajectory of the aircraft.

The present invention applies to the rolling of an aircraft on the ground, in particular an airplane, civil or military, for transporting passengers or merchandise (freight), or else a drone (pilotless aircraft). It relates, more particularly, to the generation of a speed profile which is associated with a ground trajectory, said profile being such that the aircraft can be guided, manually or automatically, along this trajectory (longitudinal guidance) on an airport domain such as an aerodrome or an airport.

Within the framework of the present invention, the following meanings are implied:

"rolling on the ground" implies any type of possible rolling of an aircraft, such as rolling on a landing runway in the course of the landing and takeoff phases, or rolling on trafficways or on maneuvering areas, in particular; and "automatic guidance" implies the action of a system forming an integral part of the aircraft and capable of ensuring, partially or totally, that is to say without aid or with the partial aid of a (human) operator, the driving of an aircraft on the ground.

Currently, the (human) pilot controls the longitudinal movements of the aircraft (that is to say its speed and/or its acceleration) on the ground, with the aid of manual piloting facilities (for example a lever for controlling the thrust of the engines and brake pedals), along a ground trajectory. These piloting facilities make it possible to control actuators of the aircraft capable of influencing the longitudinal movements of the aircraft, in particular by way of the engines and brakes or any type of means able to act on the longitudinal movements of the aircraft.

The term "ground trajectory" designates the pathway followed by the aircraft on the airport domain, including in particular the takeoff and landing runways, the trafficways or taxiways, the turn-around areas, the waiting zones, the stop bars, the stopping positions (stand), the maneuvering areas, and the parking areas.

The ground trajectory is generally provided to the pilot by an air traffic controller or ground controller, for example by way of radiocommunication means or some other standard means such as a digital data transmission link, but it can also, in certain cases, be chosen freely by the pilot.

The trajectory is defined in the form of a succession of elements of the airport domain, and indicates a path making it possible to attain, from one point or region of the airport domain, another point or region of this domain.

Knowing the ground path to be followed, the pilot acts on the aforesaid piloting facilities, so as to control the longitudinal movements of the aircraft on the ground, in such a way as to pilot the aircraft, in particular during a taxiing phase, at a speed compatible, in particular, with the airport regulations and the comfort of the passengers.

Currently, even if regulatory and operational limits exist, the speed of the aircraft is left to the free judgment of the pilot during the taxiing phase. Specifically, he adjusts the speed of the aircraft, as a function of his intuition relating to the state of the runway and trafficways (dry, wet, snowy, etc.), atmospheric conditions (wind, fog, snow), visibility (in particular whether it is day or night), and also as a function of the form of the ground trajectory (tight turn, wide curve, straight line) and of his feeling in relation to the aircraft (inertia, grip of the tires). No device currently exists which makes it possible to automate the determination of a speed setpoint to be adopted during the taxiing phase.

Consequently, it is not possible in particular to predict the duration of the taxiing phase, or the times at which certain points of the airport domain are passed, which information could allow the air/ground traffic control to optimize the airport traffic and to anticipate conflicts thereof.

Additionally, it is not possible, in the current state, to predict and quantify, while rolling on the ground, the fuel consumption, the energy stored up in the brakes, and the wear of the brakes, the use of which by the pilot is generally not optimal.

Furthermore, the comfort of the passengers is directly related to the lateral and longitudinal accelerations, which currently remain entirely dependent on the way in which the pilot controls the aircraft on the ground.

The object of the present invention is to remedy the aforesaid drawbacks. It relates to a method of generating a speed profile of an aircraft, in particular a transport airplane, said speed profile being associated with a ground rolling trajectory of the aircraft on an airport domain.

For this purpose, according to the invention, said device is noteworthy in that:

a) said (ground rolling) trajectory which comprises a series of elements of the airport domain is received;

b) first constraints (regulatory speed, load factor, etc.) are received relating to the rolling of the aircraft on the airport domain;

c) for each of said elements of said trajectory, an associated maximum speed is determined automatically by taking account of said first predetermined constraints;

d) second constraints [time constraint, constraints on load factor and jerk (derivative of the acceleration), etc.] are received relating to the rolling of the aircraft on the airport domain;

e) a speed profile which is suited to each element of the trajectory and which complies with the set of maximum speeds and second constraints is determined automatically by taking account of the maximum speeds determined in step c) and of said second constraints, said speed profile being such that it provides a variation of the longitudinal speed as a function of the time which elapses during the rolling of the aircraft along said trajectory; and f) this speed profile is provided to at least one user system.

Thus, by virtue of the invention, a speed profile is obtained which complies with the set of said maximum speeds and of said (first and second) constraints.

Within the framework of the present invention, the expression "speed profile associated with a (ground rolling) trajectory", is understood to mean a set of speed values corresponding to a set of positions (or of time values) along this trajectory, these two sets possessing the same number of elements.

When the speed profile is expressed as a function of time, it does not take account of certain disturbances, of actuator delays, of the inertia of the aircraft etc., in such a way that this speed profile is based on an ideal virtual time. So, in order to render this speed profile more robust in the face of the vagaries and dynamics of the aircraft, in an advantageous manner, in step e), said speed profile is adapted so as to obtain a longitudinal speed variation as a function of the position of the aircraft, which is expressed for example in the form of a normed curvilinear abscissa, along said trajectory.

In a particular embodiment, in step c), the speed which is a minimum from among at least said following speeds is determined as maximum speed for an arbitrary element of the trajectory:
- an admissible maximum speed while turning so as to ensure the comfort of the passengers of the aircraft;
- a maximum yaw rate that can be supported by the aircraft;
- a regulatory speed in a straight line;
- a regulatory speed while turning;
- a maximum speed complying with admissible load limits on the various landing gear of the aircraft; and
- a maximum speed dependent on the grip of the tires of the aircraft.

Moreover, in an advantageous manner, in step c), said maximum speed is adjusted for at least one element of the trajectory, if appropriate, as a function of required accelerations and decelerations. Thus, it is possible to remedy the fact that the maximum speed such as defined previously fixes a maximum speed for each of the elements of the trajectory, taken separately, which may give rise to drawbacks. In particular, the length of a trajectory element may not be sufficient to attain a speed which is below the current speed when decelerating. So, in this case, the maximum speed is adjusted by limiting it to a value such that the aircraft has time to brake over the permitted distance. Conversely, the length of a trajectory element may not be sufficient to attain a speed above the current speed, when accelerating. This drawback can also be alleviated by adjusting said maximum speed.

Additionally, in a particular embodiment, in step e), for each element of the trajectory:
- switching times are determined;
- particular speed variations between the various successive switching times are calculated; and
- the speed profile corresponding to this trajectory element is constructed, taking account of said speed variations and said switching times.

Furthermore, in a first variant embodiment, in step e), in the absence of a time constraint, a cost index is taken into account to determine said speed profile, said cost index making a compromise between a maximum speed on each element of the trajectory and a limitation of the (untimely) use of the engines and brakes of the aircraft.

Within the framework of the present invention, the expression "time constraint" is understood to mean a time at which a given point (or waypoint) is passed and which the aircraft must comply with during its journey along the ground trajectory.

Furthermore, in a second variant embodiment, in step (e), at least one time constraint is taken into account to determine said speed profile, which therefore defines a particular time at which the aircraft passes a particular point of said trajectory.

Additionally, advantageously, in step e), the response time of engines of the aircraft, following a speed control, can also be taken into account to determine said speed profile.

Furthermore, in a particular embodiment, at least one of the following predictions is carried out for said trajectory:
- a prediction of the travel time;
- a prediction of the distance traveled; and
- a prediction of the energy stored in the brakes of the aircraft, as well as the temperature of the brakes at destination.

By virtue of this particular embodiment, it is possible to estimate a certain number of parameters characteristic of the trajectory and of the manner in which the latter is traversed, thereby making it possible in particular to aid the pilot to make operational choices.

Consequently, by virtue of the present invention, and as specified further below:
- a speed profile which is suited to a given ground trajectory is generated in such a way that this profile complies with a certain number of constraints related to the form of the trajectory, and in particular:
  - regulatory constraints (maximum speed in a straight line and while turning for example);
  - constraints related to the curvature of the turns (comfort of the passengers, lateral load factor, load on the main gear, grip of the tires); and
  - longitudinal constraints on load factor and jerk (derivative of the acceleration);
- it is possible to quantify the lateral and longitudinal accelerations, the cause of travel sickness, with a view to eliminating their effects;
- it is possible to optimize the use of actuators, by limiting the intensity and number of applications of brakings and accelerations, thereby making it possible to decrease brake wear and fuel consumption by the engines relative to manual piloting;
- it is possible to optimize the travel time between two points of the airport domain, and therefore to reduce the occupancy time of the runways, trafficways, or any other element of the airport domain;
- it is possible to choose, by way of a cost index value, an adopted strategy by choosing a compromise between:
  - minimum occupancy time of the runways and taxiways; and
  - minimum use of the brakes and engines;
- account is taken of time constraints provided in particular by the air traffic control and/or the ground control. Thus, a controller can impose times at which the aircraft passes certain points of the airport, so as to optimize the scheduling and keep the airport traffic flowing;
- it is possible to predict, before the aircraft lands or during the ground rolling phase, the occupancy time of the runways, taxiways, or any other element of the airport domain, to inform the air traffic control and/or the ground control thereof, and therefore to enable the latter to anticipate potential ground circulation problems and to adapt the airport scheduling accordingly;
- the airlines are able to improve predictions regarding the use of actuators, in particular of the engines (consumption while rolling on the ground) and brakes (estimation of the wear of the brakes, thereby affording advantages in terms of maintenance); and
- in the case where the speed of the aircraft is controlled manually, it is possible to provide the pilot with an optimal speed profile to be followed, as well as with the speeds not to be exceeded, having regard to the aforesaid constraints.

The present invention also relates to a device for generating a speed profile of an aircraft, in particular a transport airplane, said speed profile being associated with a ground rolling trajectory of the aircraft on an airport domain.

According to the invention, said device is noteworthy in that it comprises:
- means for receiving said trajectory which comprises a series of elements of the airport domain;
- means for receiving first constraints relating to the rolling of the aircraft on the airport domain;
- means for automatically determining, for each of said elements of said trajectory, an associated maximum speed, by taking account of said first predetermined constraints;

means for receiving second constraints relating to the rolling of the aircraft on the airport domain;

means for automatically determining, by taking account of said maximum speeds and of said second constraints, a speed profile which is suited to each element of the trajectory and which complies with the set of maximum speeds and second constraints, said speed profile being such that it provides a variation of the longitudinal speed as a function of the time which elapses during the rolling of the aircraft along said trajectory; and means for providing this speed profile to at least one user system.

The present invention also relates to an aircraft, in particular a transport airplane, which is furnished with a device for generating a speed profile, such as that aforesaid.

The figures of the appended drawing will elucidate the manner in which the invention may be embodied. In these figures, identical references designate similar elements.

Figure 1:
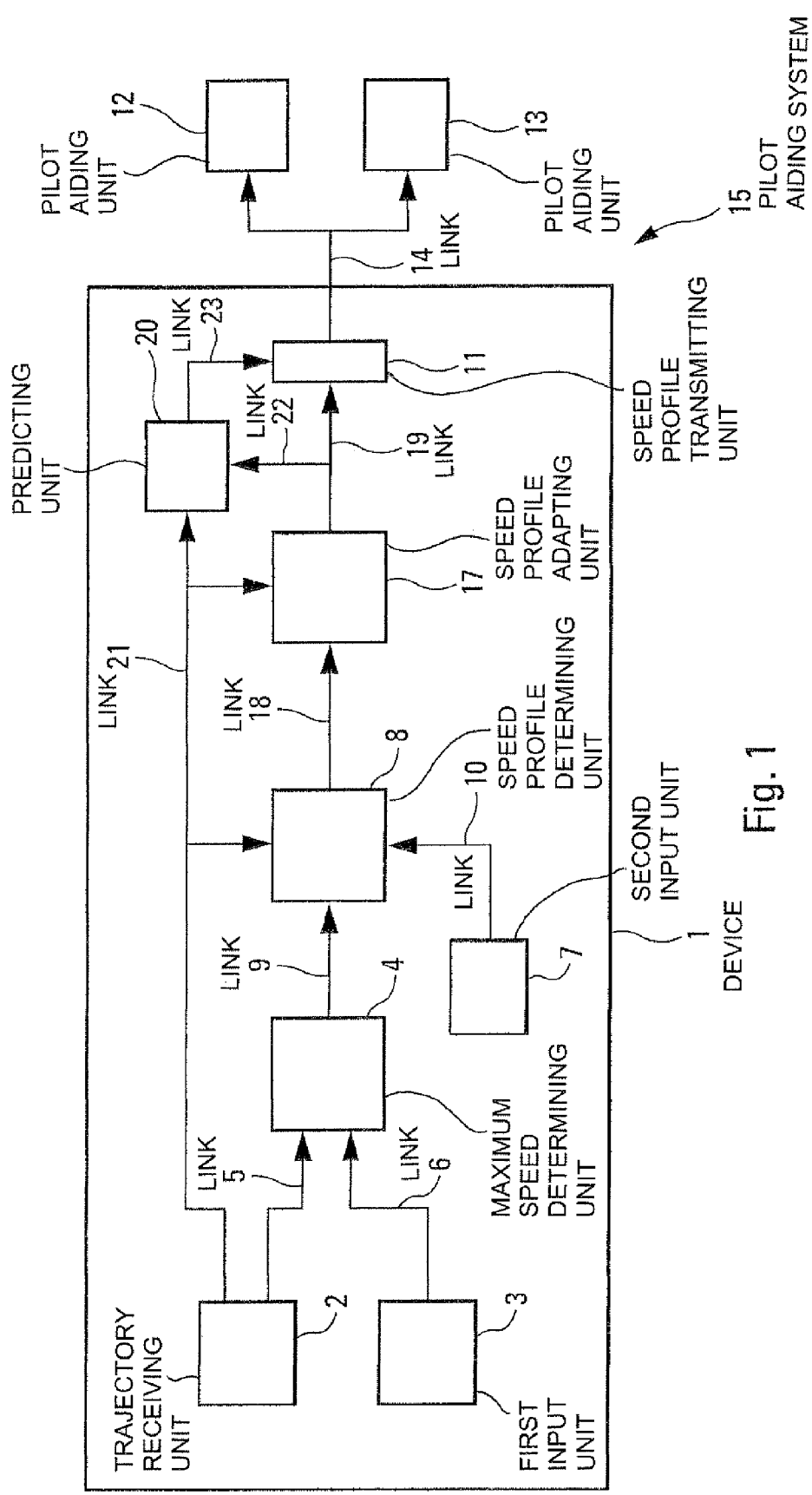
FIG. 1 is the schematic diagram of a device in accordance with the invention for generating a speed profile for an aircraft.

The device 1 in accordance with the invention and represented schematically in FIG. 1, is intended to automatically generate a speed profile PV of an aircraft (not represented), in particular of a transport airplane. This speed profile PV is associated with a ground rolling trajectory (not represented) of the aircraft on an airport domain such as an airport or an aerodrome.

The expression "ground (rolling) trajectory" refers to the path followed by the aircraft on the airport domain, including in particular the takeoff and landing runways, the trafficways or taxiways, the turn-around areas, the waiting zones, the stop bars, the stopping positions (stand), the maneuvering areas, and the parking areas.

Figure 2:
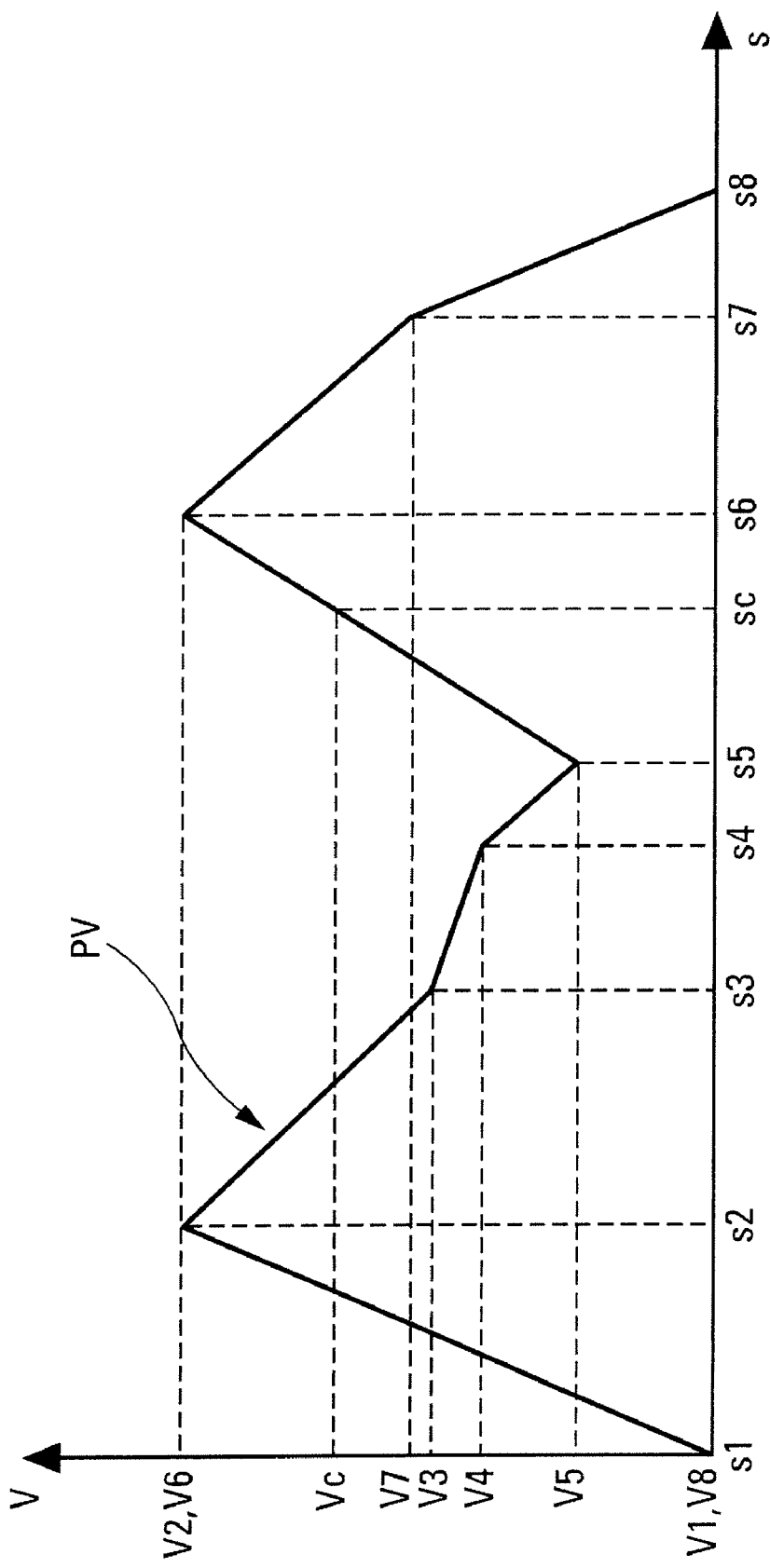
FIG. 2 is a graphic illustrating a speed profile.

Within the framework of the present invention, the expression "speed profile PV which is associated with a (ground rolling) trajectory" is understood to mean a set of values of the speed V corresponding either to a set of positions (expressed for example in the form of curvilinear abscissae s) along this trajectory, as represented in FIG. 2, or to a set of time values. These two sets (speeds/positions or speeds/times) possess the same number of elements (s1 to s8 and V1 to V8) so that, in the example of FIG. 2, with a position s1 is associated a speed V1, with a position s2 is associated a speed V2, etc., and with a position s8 is associated a speed V8. In FIG. 2 is also represented a current position sc with the corresponding speed Vc such as defined by said speed profile PV.

According to the invention, said device 1 which is onboard, comprises:

means 2 for receiving said ground rolling trajectory, which comprises a series of successive elements of the airport domain, indicating a path making it possible to attain, from one point or region of the airport domain, another point or region of said domain. Any portion of the domain, whether or not designated by a name, and identified as a distinct and delimited part of the domain, is called an element of the airport domain. The elements can relate, in particular, to the takeoff and landing runways, the trafficways or taxiways, the turn-around areas, the waiting zones, the stop bars, the stopping positions (stand), the maneuvering areas and the parking areas;

means 3 for receiving first constraints (regulatory speed, load factor, etc.) specified below, which relate to the rolling of the aircraft on the airport domain;

means 4 which are connected by way of links 5 and 6 respectively to said means 2 and 3 and which are formed so as to determine, for each of said elements of said trajectory, an associated maximum speed, by taking account of said first predetermined constraints;

means 7 for receiving second constraints [time constraint, constraints on load factor and jerk (derivative of the acceleration), etc.] specified below, which relate to the rolling of the aircraft on the airport domain;

means 8 which are connected by way of links 9 and 10 respectively to said means 4 and 7 and which are formed so as to determine, by taking account of said maximum speeds and of said second constraints, a speed profile PV which is suited to each element of the trajectory and which complies with the set of maximum speeds and second constraints. This speed profile PV is such that it provides a variation of the longitudinal speed as a function of the time which elapses during the rolling of the aircraft along said trajectory; and means 11 which can transmit said speed profile PV to at least one user system 12, 13 by way of a link 14.

In a particular embodiment, said device 1 forms part, together with said means 12 and 13 which relate to means for aiding the piloting, of a system for aiding piloting 15. In particular:

said means 12 can comprise an automatic pilot which pilots (longitudinally) the aircraft, in an automatic manner, according to the speed profile PV determined by the device 1; and said means 13 can comprise display means able to present, on at least one viewing screen (not represented), information allowing the pilot to ascertain said speed profile PV determined by said device 1.

Furthermore, said means 2 can comprise:

input means, in particular a keyboard, allowing an operator to input the characteristics (and in particular said elements) of the trajectory into said device 1; and/or communication means, for example a data transmission link, making it possible to receive automatically from outside, for example with the aid of communication means at the disposal of an air traffic controller or a ground controller, characteristics of the trajectory.

Moreover, said means 3, as well as said means 7, can also be input means, comprising for example a keyboard, and making it possible to input said (first and second) constraints.

In a particular embodiment, said device 1 comprises, moreover, means 17 which are connected by way of links 18 and 19 respectively to said means 8 and 11 and which make it possible to adapt said speed profile determined by the means 8 so as to obtain a longitudinal speed variation as a function of the position of the aircraft (and not now, as a function of time), which position is expressed in the form of a normed curvilinear abscissa s, along said trajectory, as represented in FIG. 2.

When the speed profile is expressed as a function of time, it does not take account of certain disturbances, actuator delays, the inertia of the aircraft etc., so that this speed profile is based on an ideal virtual time. So, said means 17 make it possible to render the speed profile more robust in the face of the vagaries and the dynamics of the aircraft, by making it depend on the current position of the aircraft, expressed in the form of a normed curvilinear abscissa on each trajectory element (expressed preferably in the form of a Bezier curve), by using an interpolation in an array of values arising from a simulation making it possible to generate the speed profile.

By way of illustration, for each Bezier curve, the curvilinear abscissa s varies between 0 and 1. The correspondence between the position X and the normed curvilinear abscissa s is determined, for an element Ei, according to the following relation:

$$Scurrent = \frac{Xcurrent - Xoi}{Li}$$

with Li the length of the element Ei and Xoi the position at the start of the element Ei, such that:

$$Xoi = \sum_{n=1}^{i-1} Ln$$

The speed profile PV can be provided by the means 11 in the form of an array which consists, for example, of three lines indicating respectively the serial number of the current element, the speed and the normed curvilinear abscissa.

As the speed profile PV is generated only once (except in the event of subsequent modification of the trajectory or constraints) and in advance with respect to its use for longitudinal guidance (for example, the profile may be known several minutes before landing if the air traffic control provides the pilot with all the information necessary for the device 1), it is possible to make a certain number of predictions (specified below) relating to the ground rolling phase. In particular:
  the number and intensity of the longitudinal accelerations being known, it is possible to estimate the quantity of fuel which will be consumed while rolling;
  the number and intensity of the decelerations being known, it is possible to calculate the energy stored in the brakes in the course of rolling, and therefore to estimate the temperature of the brakes at the end of the rolling phase, as well as the wear of the brakes, this being advantageous in terms of maintenance;
  the speed profile PV gives directly the total travel time of the rolling phase, as well as the times at which the waypoints and stopping points are passed; and
  associated with the form of the trajectory, the speed profile PV makes it possible to predict the number and intensity of the lateral and longitudinal accelerations experienced by the passengers, thereby making it possible to estimate the kinetosis dose value (MSDV: "Motion Sickness Dosage Value"), for example by the procedures provided in the ISO 2631 (1997) and BSI 6841 (1987b) standards. If the kinetosis dosage is too large, it is possible to provide stronger constraints in terms of lateral and longitudinal load factors (that is to say lower values of Nxmax and Nymax specified hereinafter) and to recalculate the speed profile so as to obtain an acceptable kinetosis dose.

The means 4 calculate, for each element Ei of the trajectory, an admissible maximum speed Vmax. This maximum speed Vmax depends on a certain number of constraints (received directly with the aid of the means 3 or determined on the basis of information received with the aid of said means 3), and in particular:
  on a maximum lateral load factor: Nymax. This load factor defines, as a function of the maximum curvature Cmax of the current element Ec of the trajectory (received from said means 2 with the information relating to the trajectory), an admissible maximum speed while turning, corresponding to passenger comfort:

$$Vcomfort = \sqrt{\frac{Nymax \cdot g}{|Cmax|}},$$

g being the acceleration due to gravity;
  on a maximum yaw rate rmax that can be supported by the aircraft:

$$Vyaw = \frac{rmax}{|Cmax|}$$

on regulatory speeds:
    Vregl1 in a straight line;
    Vregl2 while turning;
  on a maximum speed Vload complying with the limits of the admissible loads on the various gear; and
  on a maximum speed Vgrip dependent on the grip of the tires.

Additionally, the speed must be zero at the level of the trajectory elements corresponding to stopping points (stands, stops).

The speed Vmax to be considered is that which is the most constraining, that is to say:
Vmax=min(Vcomfort, Vyaw, Vregl1, Vregl2, Vload, Vgrip), min representing Additionally, the construction of the speed profile also depends on maximum accelerations and jerks, whose values are related to the comfort of the passengers:
  maximum longitudinal load factor: Nxmax;
  maximum longitudinal jerk (or overacceleration): Jmax.

The above constraints fix a maximum speed on each of the trajectory elements Ei taken separately. This result must however be corrected in certain cases. Specifically, the length of a trajectory element may not be sufficient to attain a speed below the current speed, during deceleration. In this case, the maximum speed is limited to a value such that the aircraft has time to brake over the permitted distance. Each element is therefore considered, beginning with the end of the trajectory and backtracking to the first element, and the envelope of admissible maximum speeds is modified if necessary according to an algorithm for adjusting the admissible maximum speeds during decelerations, which is such that, for each element Ei, and starting from the end, if Vmax(i−1)>Vmax (i), then:
  the braking distance necessary to go from the speed Vmax (i−1) to the speed Vmax(i) while complying with the jerk and deceleration constraints is calculated, and if this distance is greater than 90% of the length of the segment Ei-1, then as long as it remains so:
  Vmax(i−1) is decremented in steps of [Vmax(i−1)−Vmax(i)]/10; and
  the braking distance is recalculated; and the former value of Vmax(i−1) is replaced with the new value.

Conversely, the length of a trajectory element may not be sufficient to attain a speed above the current speed, during acceleration. Consequently, it is necessary to repeat the pass through the list (or envelope) of admissible speeds, this time beginning with the first element, doing so according to an algorithm for adjusting the admissible maximum speeds during accelerations, which is such that, for each element Ei, starting from the first element, if Vmax(i)<Vmax(i+1), then:
 the acceleration distance necessary to go from the speed Vmax(i) to the speed Vmax(i+1) while complying with the jerk and acceleration constraints is calculated:
  if this distance is greater than 90% of the length of the segment Ei, then:
   as long as this distance is greater than 90% of the length of the segment i:
    Vmax(i+1) is decremented in steps of [Vmax(i+1)−Vmax(i)]/10;
    the acceleration distance is recalculated; and
 the former value of Vmax(i+1) is replaced with the new value.

The list (or envelope) of admissible speeds therefore undergoes the following steps:
 constraints: comfort, yaw, regulation, load, grip;
 decelerations: backward adjustment of the maximum speeds;
 accelerations: adjustment in the order of the maximum speeds.

These various constraints fix a ground protection domain which guarantees, during longitudinal piloting, nominal behavior inside the speed envelope.

On the basis of this envelope of admissible maximum speeds, determined by the means 4, the means 8 construct a speed profile PV that best fulfills this envelope as a function of acceleration and jerk constraints, time constraints, and operational choices (cost index).

Figure 3:
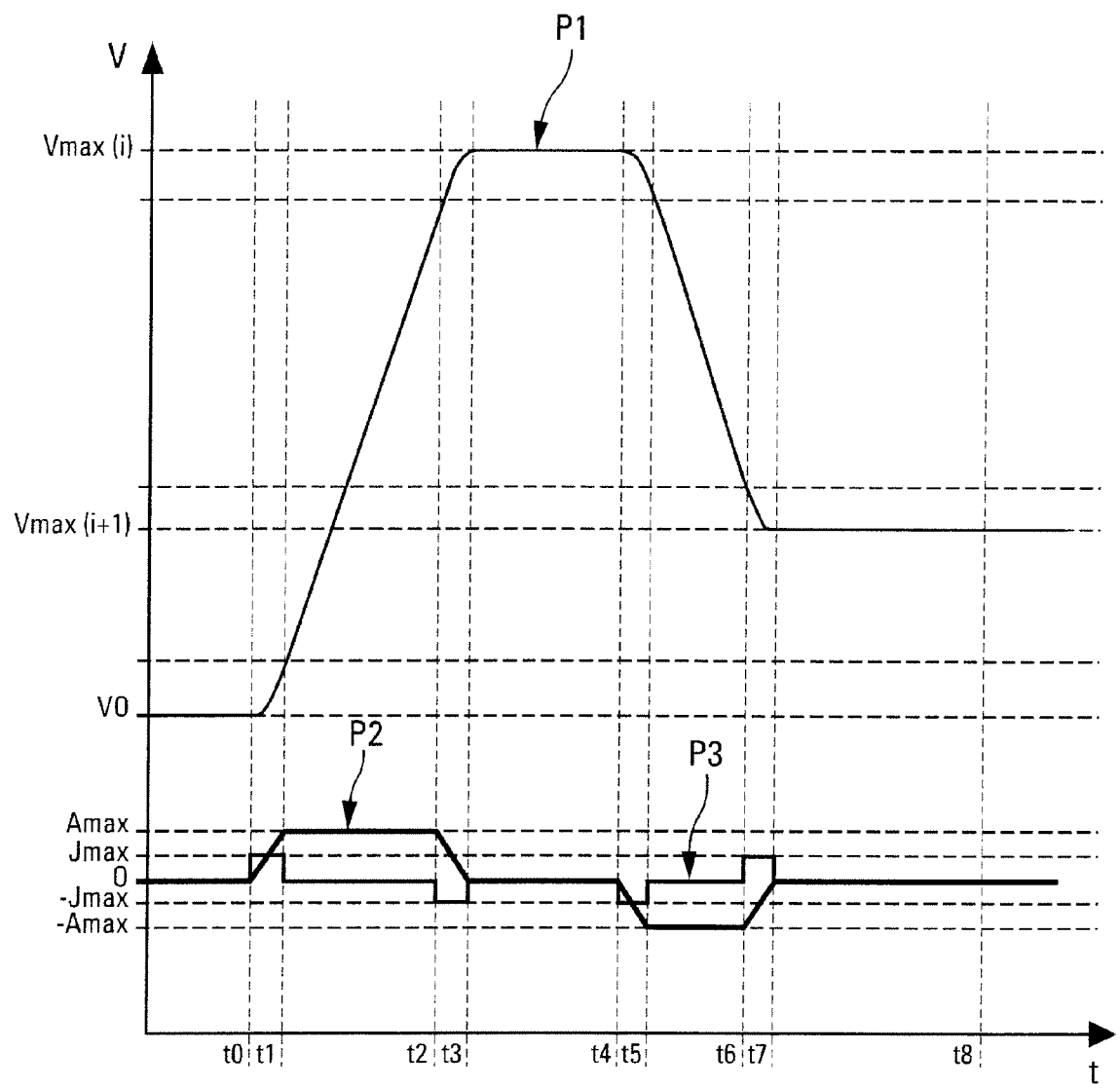
FIG. 3 is a graphic making it possible to explain certain characteristics of a speed profile.

The calculations making it possible to construct the profiles of jerk (J(t)), acceleration (y(t)), speed (V(t)) and position (X(t)) as a function of time t are now presented for the most complete case, that is to say an acceleration up to Vmax (i), a plateau at Vmax(i), a deceleration down to Vmax (i+1), then the remainder of the curve at Vmax (i+1), as represented in FIG. 3. All the other cases (simple acceleration, simple deceleration), are deduced immediately from these calculations.

In FIG. 3:
P1 represents the speed profile (speed V as a function of time t);
P2 represents an acceleration profile (between −Amax and +Amax, with Amax=Nxmax.g), Nxmax being the maximum longitudinal load factor and g being the acceleration due to gravity;
P3 represents a jerk profile between −Jmax and +Jmax, Jmax being the maximum longitudinal jerk; and
t1, t2, etc. t8 represent the time intervals over which a given equation is considered. For example, t3 corresponds to the interval [0; t3] with time origin t2, i.e., by bringing the time origin back to 0, to the interval [t2; t2+t3].

These time intervals satisfy the following equations:

Interval 1: $[t0; t1]$ $$\begin{cases} J(t) = J\max \\ \gamma(t) = J\max \cdot t \\ V(t) = \frac{1}{2} \cdot J\max \cdot t^2 + V0 \\ X(t) = \frac{1}{6} \cdot J\max \cdot t^3 + V0 \cdot t + X0 \end{cases}$$

at $t = t1$ $\begin{cases} J1 = J\max \\ \gamma 1 = J\max \cdot t1 \\ V1 = \frac{1}{2} \cdot J\max \cdot t1^2 + V0 \\ X1 = \frac{1}{6} \cdot J\max \cdot t1^3 + V0 \cdot t1 + X0 \end{cases}$ Interval 2: $[t1; t2]$ $$\begin{cases} J(t) = 0 \\ \gamma(t) = \gamma 1 \\ V(t) = \gamma 1 \cdot t + V1 \\ X(t) = \frac{1}{2} \cdot \gamma 1 \cdot t^2 + V1 \cdot t + X1 \end{cases}$$

at $t = t2$ $\begin{cases} J2 = 0 \\ \gamma 2 = \gamma 1 \\ V2 = \gamma 1 \cdot t2 + V1 \\ X2 = \frac{1}{2} \cdot \gamma 1 \cdot t2^2 + V1 \cdot t2 + X1 \end{cases}$ Interval 3: $[t2; t3]$ $$\begin{cases} J(t) = -J\max \\ \gamma(t) = -J\max \cdot t + \gamma 2 \\ V(t) = -\frac{1}{2} \cdot J\max \cdot t^2 + \gamma 2 \cdot t + V2 \\ X(t) = -\frac{1}{6} \cdot J\max \cdot t^3 + \frac{1}{2} \cdot \gamma 2 \cdot t^2 + V2 \cdot t + X2 \end{cases}$$

at $t = t3$ $\begin{cases} J3 = -J\max \\ \gamma 3 = -J\max \cdot t3 + \gamma 2 \\ V3 = -\frac{1}{2} \cdot J\max \cdot t3^2 + \gamma 2 \cdot t3 + V2 \\ X3 = -\frac{1}{6} \cdot J\max \cdot t3^3 + \frac{1}{2} \cdot \gamma 2 \cdot t3^2 + V2 \cdot t3 + X2 \end{cases}$ Interval 4: $[t3; t4]$ $$\begin{cases} J(t) = 0 \\ \gamma(t) = 0 \\ V(t) = V\max(i) \\ X(t) = V\max(i) \cdot t + X3 \end{cases}$$

at $t = t4$ $\begin{cases} J4 = 0 \\ \gamma 4 = 0 \\ V4 = V\max(i) \\ X4 = V\max(i) \cdot t4 + X3 \end{cases}$ -continued Interval 5: $[t4; t5]$ $$\begin{cases} J(t) = -J\max \\ \gamma(t) = -J\max \cdot t \\ V(t) = -\frac{1}{2} \cdot J\max \cdot t^2 + V4 \\ X(t) = -\frac{1}{6} \cdot J\max \cdot t^3 + V4 \cdot t + X4 \end{cases}$$

at $t = t5$ $\begin{cases} J5 = J\max \\ \gamma 5 = J\max \cdot t5 \\ V5 = -\frac{1}{2} \cdot J\max \cdot t5^2 + V4 \\ X5 = -\frac{1}{6} \cdot J\max \cdot t5^3 + V4 \cdot t5 + X4 \end{cases}$ Interval 6: $[t5; t6]$ $$\begin{cases} J(t) = 0 \\ \gamma(t) = \gamma 5 \\ V(t) = \gamma 5 \cdot t + V5 \\ X(t) = \frac{1}{2} \cdot \gamma 5 \cdot t^2 + V5 \cdot t + X5 \end{cases}$$

at $t = t6$ $\begin{cases} J6 = 0 \\ \gamma 6 = \gamma 5 \\ V6 = \gamma 5 \cdot t6 + V5 \\ X6 = \frac{1}{2} \cdot \gamma 5 \cdot t6^2 + V5 \cdot t6 + X5 \end{cases}$ Interval 7: $[t6; t7]$ $$\begin{cases} J(t) = J\max \\ \gamma(t) = J\max \cdot t + \gamma 6 \\ V(t) = \frac{1}{2} \cdot J\max \cdot t^2 + \gamma 6 \cdot t + V6 \\ X(t) = \frac{1}{6} \cdot J\max \cdot t^3 + \frac{1}{2} \cdot \gamma 6 \cdot t^2 + V6 \cdot t + X6 \end{cases}$$

at $t = t7$ $\begin{cases} J7 = J\max \\ \gamma 7 = J\max \cdot t7 + \gamma 6 \\ V7 = \frac{1}{2} \cdot J\max \cdot t7^2 + \gamma 6 \cdot t7 + V6 \\ X7 = \frac{1}{6} \cdot J\max \cdot t7^3 + \frac{1}{2} \cdot \gamma 6 \cdot t7^2 + V6 \cdot t7 + X6 \end{cases}$ Interval 8: $[t7; t8]$ $$\begin{cases} J(t) = 0 \\ \gamma(t) = 0 \\ V(t) = V\max(i+1) \\ X(t) = V\max(i+1) \cdot t + X7 \end{cases}$$

at $t = t8$ $\begin{cases} J8 = 0 \\ \gamma 8 = 0 \\ V8 = V\max(i+1) \\ X8 = V\max(i+1) \cdot t8 + X7 \end{cases}$ The values of J, γ, V and X are calculated for a certain number of values of the time t, either at regular intervals, or according to other strategies, for example by choosing to take values spaced out over time during speed plateaus or ramps, and closely grouped values during accelerations or jerks. It is considered that the speed is the longitudinal speed, and the position is the position which is expressed along the trajectory. V0 is the speed of the aircraft at the instant t0 and X0 is its position at this instant t0.

To determine the communication times t1 to t8, the following operations are carried out.

t1, t2, t3 are calculated during the acceleration, such that:

$$t1 = \min\left(\frac{Nx\max \cdot g}{J\max}, \sqrt{\frac{V\max(i) - V0}{J\max}}\right)$$

*if $t1 = \frac{Nx\max \cdot g}{J\max}$, then $t3 = t1$ $$\begin{cases} \Delta V1 = \frac{1}{2} \cdot J\max \cdot t1^2 + Vo \\ \Delta V3 = -\frac{1}{2} \cdot J\max \cdot t3^2 + J\max \cdot t1 \cdot t3 \\ \gamma 2 = \gamma 1 = J\max \cdot t1 \end{cases}$$

whence $t2 = \frac{V\max(i) - (\Delta V1 + \Delta V3)}{\gamma 2}$

*otherwise:

$\begin{cases} t3 = t1 \\ t2 = 0 \end{cases}$

Likewise, t5, t6, t7 are calculated during the deceleration such that:

$$t5 = \min\left(\frac{Nx\max \cdot g}{J\max}, \sqrt{\frac{V\max(i) - V\max(i+1)}{J\max}}\right)$$

*if $t5 = \frac{Nx\max \cdot g}{J\max}$, then:

$t7 = t5$ $$\begin{cases} \Delta V5 = -\frac{1}{2} \cdot J\max \cdot t5^2 \\ \Delta V7 = \frac{1}{2} \cdot J\max \cdot t7^2 - J\max \cdot t5 \cdot t7, \\ \gamma 6 = \gamma 5 = -J\max \cdot t5 \end{cases}$$

whence $t6 = -\left[\frac{V\max(i) + (\Delta V5 + \Delta V7) - V\max(i+1)}{\gamma 6}\right]$

*otherwise:

$\begin{cases} t7 = t5 \\ t6 = 0 \end{cases}$

To determine t4 [plateau at Vmax(i)], a first calculation with t4=0 is performed so as to determine the position at t7 in the case of an acceleration immediately followed by a deceleration. X7' denotes this position, X0 the initial position and L(i) the length of the curve (or element) Ei. The variable λweight is a weighting factor, varying between 0 and 1, and is detailed below. From this we deduce t4 and t8:

$$\begin{cases} t4 = \frac{\lambda\text{weight} \cdot [L(i) - (X7' - X0)]}{V\max(i)} \\ t8 = \frac{(1 - \lambda\text{weight}) \cdot [L(i) - (X7' - X0)]}{V\max(i+1)} \end{cases}$$

Figure 4:
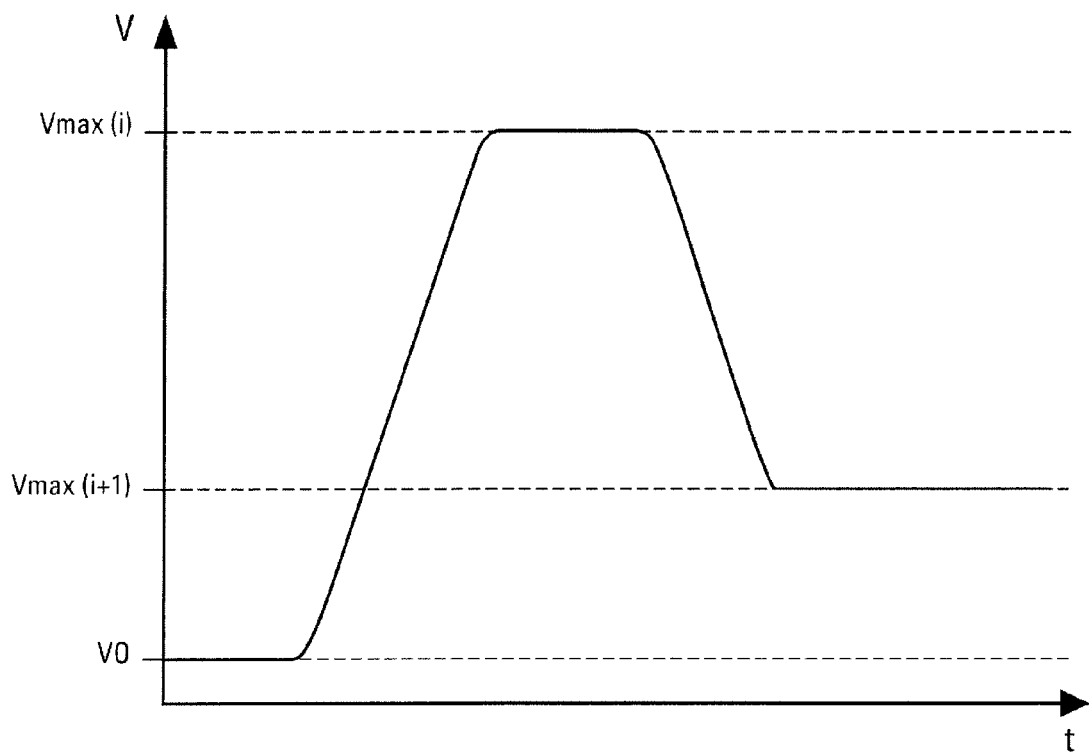
FIGS. 4 to 9 are graphics which make it possible to explain the construction of a speed profile.
Figure 5:
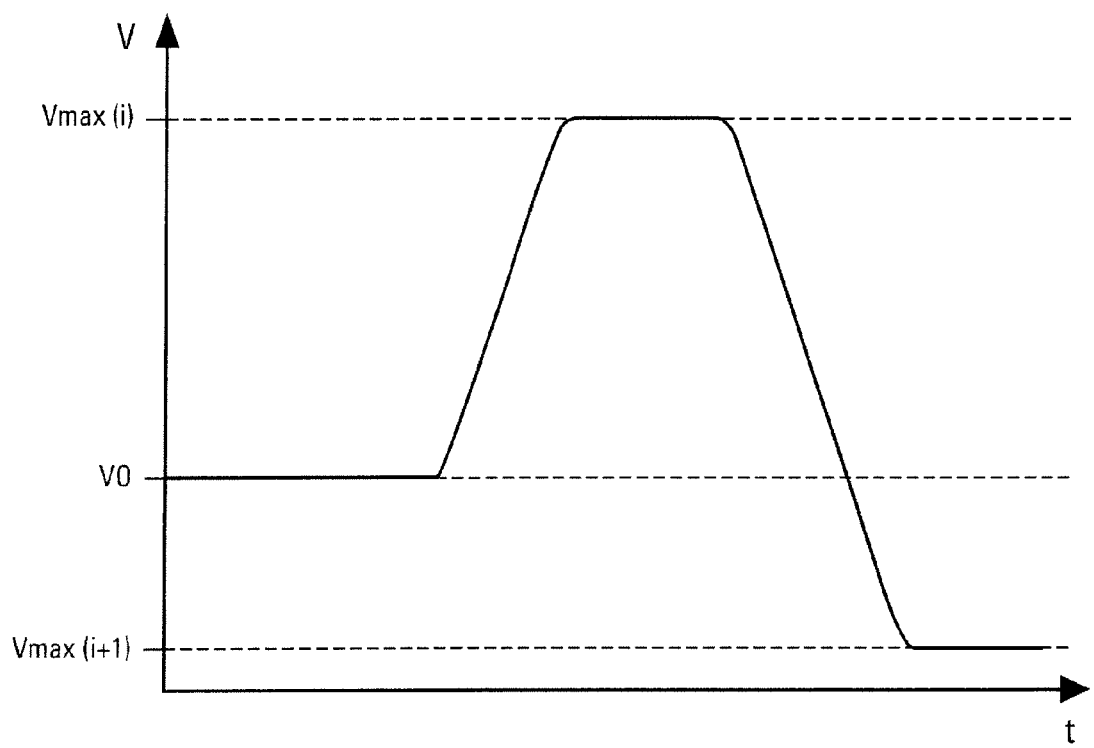
Figure 6:
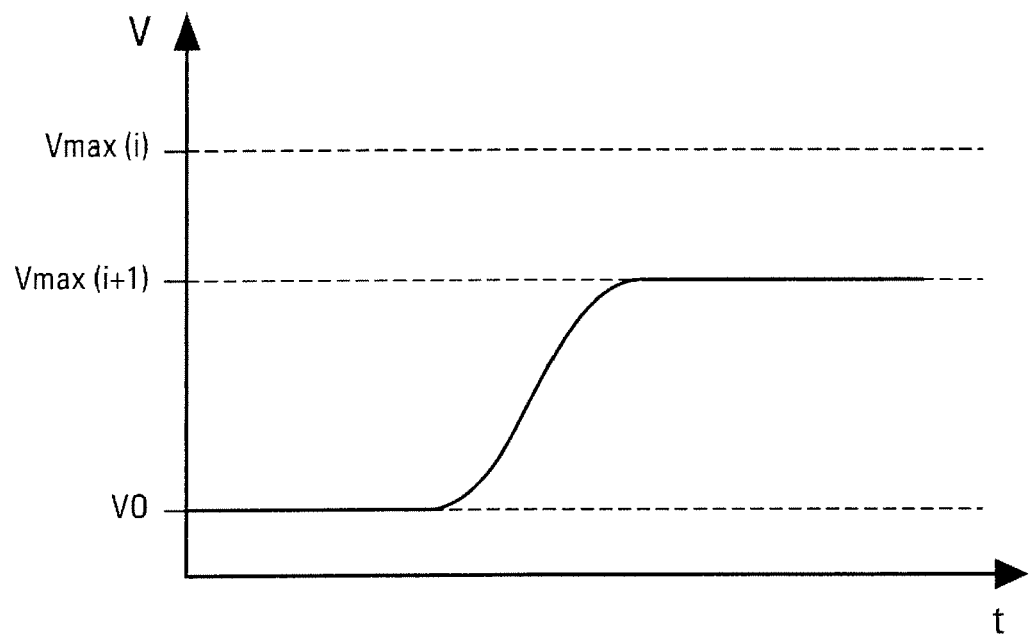
Figure 7:
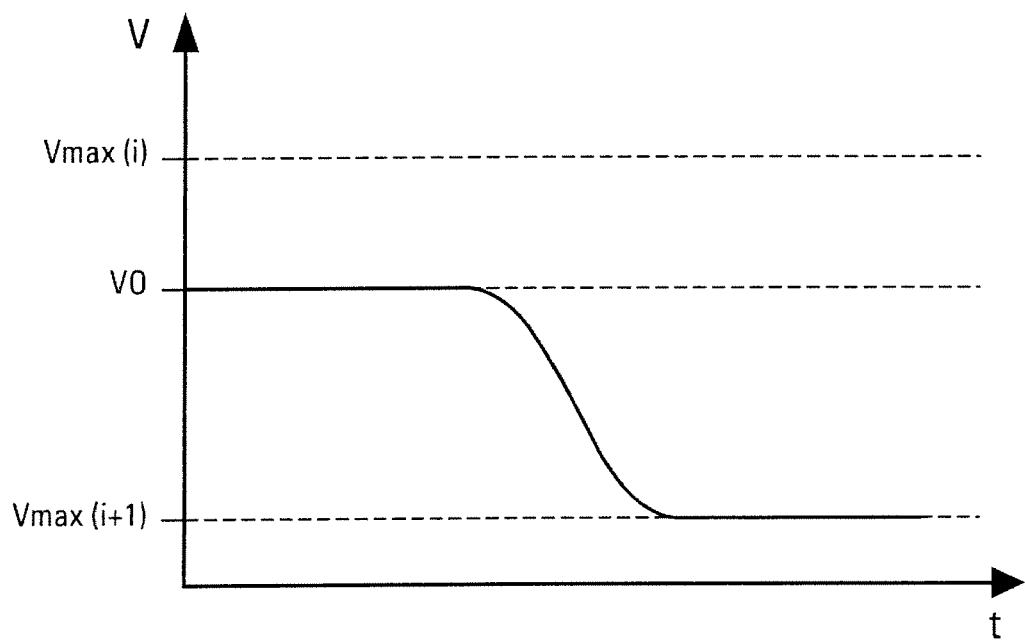
Figure 8:
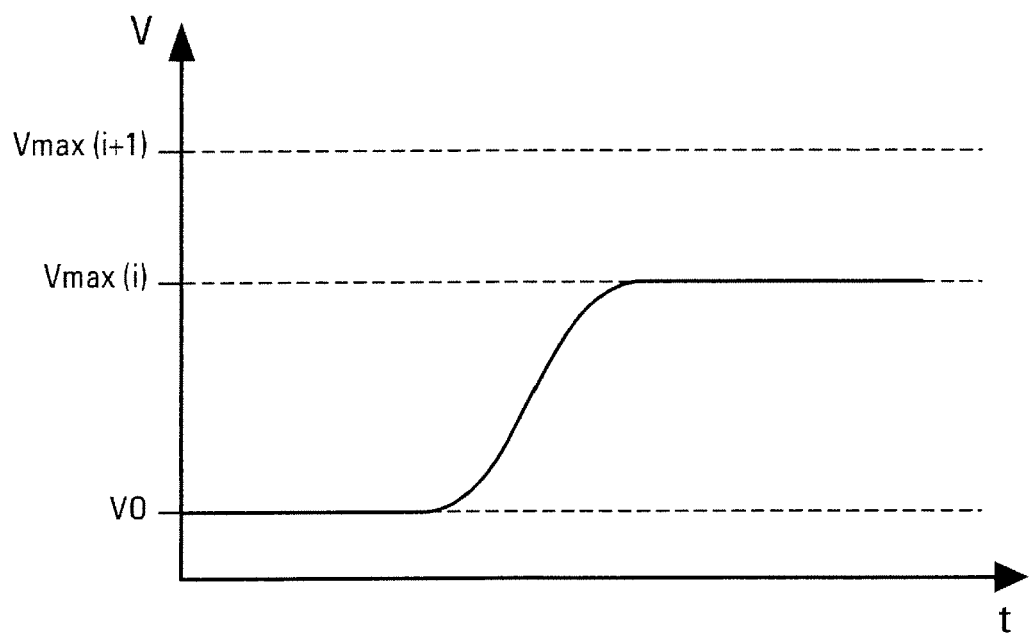
Figure 9:
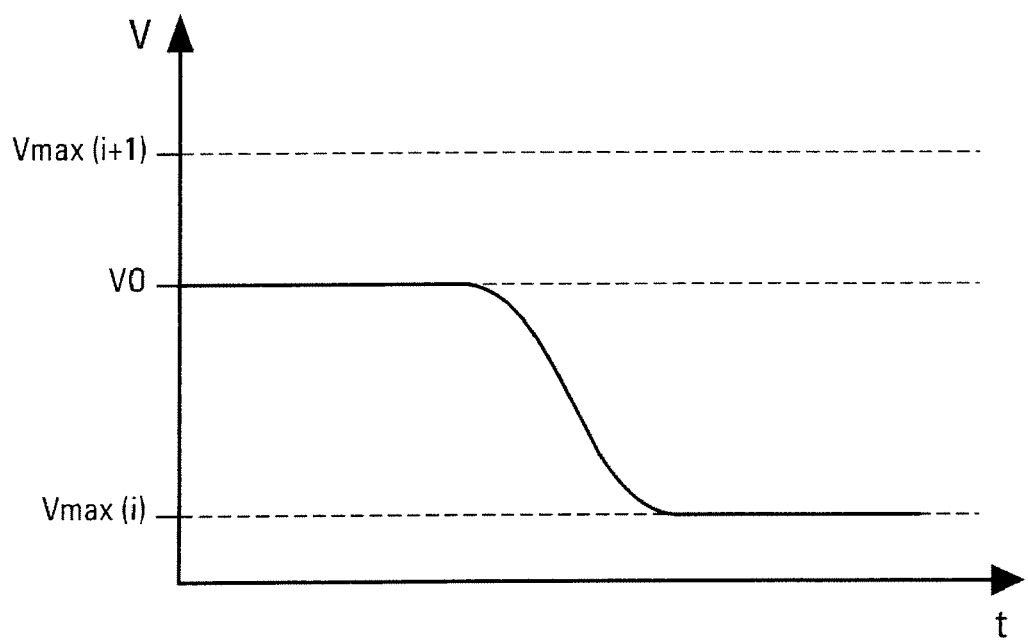

To construct the complete profile, the following construction algorithm is used:
if Vmax(i)>Vmax(i+1), then:
 if X[t0;t3]+X[t4;t7]≦λweight multiplied by the length
 L(i) of the current curve (that is to say if there is time to accelerate up to Vmax(i) and then decelerate to attain Vmax(i+1), all in less than λweight times the length of the curve), then:
  if V0<Vmax(i+1), the profile of FIG. 4 is obtained;
  otherwise [if V0>Vmax(i+1)], the profile of FIG. 5 is obtained, but the calculations are the same;
  otherwise (that is to say if X[t0;t3]+X[t4;t7]>λweight L), the length of the curve is too short to attain Vmax (i) and then Vmax(i+1). We are therefore limited to go from V0 to Vmax(i+1):
    if V0<Vmax(i+1), Vmax (i+1) is attained in a single acceleration, as represented in FIG. 6; and
    otherwise [that is to say if V0>Vmax(i+1)], Vmax(i+1) is attained in a single deceleration, as represented in FIG. 7;
  if Vmax(i)<Vmax(i+1), then:
    if V0<Vmax(i), Vmax(i) is attained in a single acceleration as represented in FIG. 8. This value is then held since it is the admissible maximum limit. Vmax(i+1) will be attained at the following segment (or element);
    otherwise [that is to say if V0>Vmax(i)], we have a case (FIG. 9) which should not normally occur, since the curve is entered at a greater speed than that authorized. A braking profile is however provided so as to attain the admissible speed as quickly as possible. Another solution could consist in anticipating the admissible speed overshoot in the course of the previous segment and authorizing a greater braking than—Nxmax.

Additionally, at the end of the trajectory, the speed profile PV must terminate with a last deceleration, so as to reach zero speed at a given point.

If the rolling phase precedes a takeoff, the last trajectory element must be, for example, the stop bar on entry to the runway threshold. If the rolling phase follows a landing, the last trajectory element corresponds, for example, to the stand at door level. The deceleration must therefore intervene so as to reach zero speed at the end of the element.

In the absence of time constraints, the general idea of the construction of the speed profile consists in considering the following assumptions:
  the aircraft must not enter a curve (or trajectory element) with a speed greater than the admissible maximum speed on this curve;
  having regard to the previous assumption, the jerk and acceleration constraints, and the lengths of the curves, a compromise is sought between:
    maximizing the speed on each curve; and
    limiting the untimely use of the engines and brakes (for example brief acceleration followed immediately by braking), doing so for reasons of comfort and brake wear.

This compromise can vary from one extreme to the other, as a function of the operational requirements of the airlines. The strategy can, specifically, consist, for example, in performing a large number of rotations over short paths, in which case it involves minimizing the occupancy time on the runway and taxiways, and therefore maximizing the speed on each curve. Conversely, if time is not the determining factor (on long haul aircraft for example), the operator can favor the second option, aimed at limiting the wear of the actuators.

The tailoring of this compromise is done via a Cost Index CI, whose value lies between 0 and 1. Two variant embodiments are proposed.

In a first variant embodiment, the tailoring of the cost index makes it possible to adjust the length (in terms of distances rather than time) of the final plateau (interval [t7;t8] of FIG. 3):
  if CI=1 (minimum occupancy time of the taxiway), the switching times are calculated precisely in such a way that at the end of deceleration, the aircraft is exactly at the end of the element. The final plateau (at Vmax(i+1)) is therefore of zero length, whereas the intermediate plateau (at Vmax(i)) is of maximum length;
  if CI=0 (minimum use of the actuators), Vmax (i+1) is attained directly by an acceleration or a deceleration, without constructing a complete type profile.

In this case, we have directly: λweight=CI. In this variant, the cost index intervenes during the construction of the speed profile.

In a second variant embodiment (representing the preferred variant), the cost index makes it possible to adjust the envelope of admissible speeds, so as to satisfy the adopted strategy:
  if CI=1 (minimum occupancy time of the taxiway), the admissible speed envelope remains unchanged, and the speed profile to be followed fulfills the envelope precisely;
  if CI=0, one seeks to modify the speed envelope so as to limit the use of the actuators.

A clipping threshold Se is fixed, above which a modulation (homothety) of the speed envelope is applied. The tailoring of the clipping threshold Se is a compromise between too low a value (which penalizes the brakes, because of continuous braking to counter the residual thrust), and too high a value (which does not make it possible to significantly reduce the number and intensity of the accelerations/brakings). Having regard to the fact that the speed of the aircraft at residual thrust equals about 25 knots, it is possible for example to fix the clipping threshold Se at 15 knots.

For each element i of the speed envelope, if Vmax(i)>Se, then Vmax(i)1 which represents the new speed value, satisfies:

$$V\max(i)1 = [V\max(i) - Se] \cdot CI + Se$$
$$V\max(i)1 = CI \cdot V\max(i) + (1 - CI) \cdot Se$$
$$\text{Thus, } \begin{cases} \text{for } CI = 1 \Rightarrow V\max(i)1 = V\max(i) \\ \text{for } CI = 0 \Rightarrow V\max(i)1 = Se \end{cases}$$

In this case, λweight is fixed at 1. In this variant embodiment, the cost index intervenes upstream of the construction of the speed profile PV, at the level of the means 4 for modifying the envelope of admissible maximum speeds, used during the generation of the profile.

A case is now considered in which a time constraint is present, associated with a trajectory. Such a time constraint exhibits the following characteristics:
  a time constraint compels the aircraft to pass a given point of the trajectory, at a given time, and with a given time margin;
  a time constraint can be associated only with the stopping points (stands and stop bars) and with the waypoints of the trajectory, that is to say with the points of the trajectory which are common to the control and to the generation of the trajectory. An arbitrary point of the trajectory cannot serve as support for a constraint. It follows from this that a time constraint associated with a stop or a stand (stopping of the aircraft) or with a waypoint (aircraft passes by without stopping there) implies that this point is previously included in the trajectory;

by default, a time constraint does not necessarily involve the stopping of the aircraft at the waypoint concerned. Only the presence of a stand or stop bar compels the aircraft to stop. Resumption is then manual (intentional action on the part of the pilot);

if the aircraft arrives early at the waypoint, it stops at this point, and resumes its course automatically when the scheduled transit time is complied with; and if conversely the aircraft's arrival at the waypoint or the stopping point is delayed, the pilot and optionally the control tower are forewarned of the magnitude of the delay. In this case, a new speed profile is recalculated on the basis of this point, in agreement with the control (or else a manual resumption of the controls by the pilot is implemented).

The travel time Tp of the aircraft between two points (waypoint, stop or stand point) with which a time constraint TC is associated is calculated. This run is calculated at minimum time, that is to say for a cost index CI of 1:

if Tp>TC, the time constraint is too tight and will not be able to be kept, it not being possible for the aircraft to travel along the pathway in less time than Tp. The only solution is then to relax the time constraint; and if Tp<TC, the time constraint can be complied with. It is then necessary to adjust the speed profile on the trajectory so as to arrive at the waypoint on schedule.

Two strategies are then possible, namely:

a first strategy termed "shortest": the idea is to preserve the speed profile for a cost index CI of 1. As the aircraft arrives early at the waypoint, it waits stationary until the moment fixed by the time constraint before setting off again. This choice is of interest if the objective is to free the taxiways as quickly as possible, even if it means having to wait at the waypoint, for example to have several aircraft cross a runway in one go; and a second strategy termed "precisely": the speed profile is adapted so as to arrive at the waypoint precisely on time. This strategy is used by default if there are no constraints regarding the freeing of the taxiways. This strategy makes it possible to minimize in a simple manner the use of the actuators by reducing the overall speed of the aircraft on the trajectory stretch concerned.

The aforesaid two strategies can be used for one and the same trajectory. The decision to use one or the other on a trajectory portion delimited by two time constraints comes under scheduling, that is to say the air traffic control responsible for the traffic on the ground.

It will be noted that:

for the first strategy, the speed profile is determined once only, with CI=1, and while taking account of the fact that the aircraft must stop at each stopping point; and for the second strategy, three variant embodiments are possible, to make it possible to arrive at the waypoint at the right time.

A first variant embodiment consists in determining the value of the cost index making it possible to obtain a travel time equal (or substantially equal) to the time constraint, for example through a dichotomy search. This solution allows best reduction in the use of the actuators.

A second variant embodiment consists in applying a homothety to the whole of the speed profile concerned, by weighting the speed command by a constant factor kTC. Specifically, one seeks to travel an identical distance in a longer time, this amounting to adjusting the speed so as to obtain a new speed profile PV(t)1 which satisfies:

$$PV(t)1 = PV(t) \cdot \frac{1}{kTC}$$

This therefore amounts to multiplying all the speed values of the profile, which relate to the trajectory element considered, by the factor $$\frac{1}{kTC}.$$

A third variant embodiment (representing the preferred variant) consists in mixing the two procedures: a search for an approximate value (to within $10^{-1}$ for example) of the cost index is performed initially, before calculating the weighting factor making it possible to accurately tailor the profile to the time constraint through the above procedure.

Additionally, in a particular embodiment, the device 1 takes account of delays due to actuators. It is known that at each acceleration, the response time of the engines gives rise to a delay tacc which is dependent on the controlled speed deviation Vf−Vi (this function depends on the aircraft and must be identified during trials). Likewise at each deceleration, the response time of the brakes gives rise to a lead tf.

It is therefore possible to take these times into account to obtain a better estimation of kTC:

$$kTC = \frac{tTC}{\left[tp + \sum_i tacc(i) + \sum_j tf(j)\right]}$$

The flattening factor of the profile kTC is not a priori the same for each trajectory portion delimited by time constraints. Consequently, if kTC[i]≠kTC[i+1], the speed profile will exhibit a discontinuity at the level of constraint i.

A solution for remedying this problem consists in:

calculating a second profile P2 a first time so as to obtain the travel time tP2 on the second trajectory portion; deducing therefrom $$kTC2 = \frac{tTC2}{tP2};$$

and recalculating the profile P2, with the cost index found previously, but choosing the new initial speed:

$$V2i = V1f \cdot \frac{kTC2}{kTC1},$$

V1f being the speed at the end of the previous trajectory portion P1.

In a particular embodiment, the device 1 in accordance with the invention comprises, moreover, prediction means 20 which are connected by way of links 21 and 22 respectively to said means 2 and 17. The link 21 also links the means 2 to the means 8 and 17.

Having regard to the aforesaid constraints, the prediction means 20 can, when the generation of the speed profile PV has concluded, estimate a certain number of quantities characteristic of the trajectory and of the manner in which the latter is traversed, doing so with a view to determining operational choices. In particular, the value of the cost index reflects the strategy relating to the compromise between performance and wear of the actuators.

These estimations, the advantage of which is that they can be performed in advance by simulation, are aimed at:
helping to choose the compromise; and
improving the predictions:
of occupancy time of the runways and taxiways (optimization of the traffic at the airport level);
of the use of the engines (consumption for ground rolling); and
of the use of the brakes (advantages in terms of maintenance).

In a preferred embodiment, said means 20 carry out for said trajectory, at least one of the following predictions:
a prediction of the travel time. The generation of the speed profile PV gives the evolution of the position and speed as a function of time. In this way, the means 20 therefore have access directly to the total travel time. This estimation can be improved by taking account of the delay and the runup time of the actuators, mainly of the engines. It is therefore possible to take account of these lags at each acceleration, so as to obtain a more realistic travel time;
a prediction of the distance traveled. The distance traveled is also accessible during the generation of the speed profile PV. It corresponds roughly to the sum of the lengths of the various successive elements of the trajectory; and
a prediction of the energy stored in the brakes of the aircraft, as well as the temperature of the brakes at destination.

Coarse estimation of the energy absorbed by the brakes consists in considering that all the kinetic energy of the aircraft is transformed into heat by the brakes. Consequently, this energy E is the sum of the energies absorbed at each deceleration, hence, if Vmax(i)>Vmax(i+1):

$$E = \frac{1}{2} \cdot m \cdot \sum (V\max(i)^2 - V\max(i+1)^2),$$

with m the mass of the aircraft.

This total energy E can then serve to estimate the temperature of the brakes at the end of the rolling phase (the relation depends on the brakes used), as well as the wear of the brakes during the rolling carried out (here again the estimation depends on the brakes).

The results of these predictions can be transmitted to a user system (external to the device 1), in particular by the means 11 (which are connected by way of a link 23 to said prediction means 20), in particular so as to be displayed.

Consequently, by virtue of the device 1 in accordance with the present invention, and as specified above:
a speed profile PV is obtained which is suited to a given ground trajectory, in such a way that this profile complies with a certain number of constraints related to the form of the trajectory, and in particular:
regulatory constraints (maximum speed in a straight line and while turning for example);
constraints related to the curvature of the turns (comfort of the passengers, lateral load factor, load on the main gear, grip of the tires); and
longitudinal constraints on load factor and jerk (derivative of the acceleration);

it is possible to quantify the lateral and longitudinal accelerations, the cause of travel sickness, with a view to eliminating their effects;
it is possible to optimize the use of actuators, by limiting the intensity and number of applications of brakings and accelerations, thereby making it possible to decrease brake wear and fuel consumption by the engines relative to manual piloting;
it is possible to optimize the travel time between two points of the airport domain, and therefore to reduce the occupancy time of the runways, trafficways, or any other element of the airport domain;
it is possible to choose, by way of a cost index value, an adopted strategy by choosing a compromise between:
minimum occupancy time of the runways and taxiways; and
minimum use of the brakes and engines;
account is taken of time constraints provided in particular by the air traffic control and/or the ground control. Thus, a controller can impose times at which the aircraft passes certain points of the airport, so as to optimize the scheduling and keep the airport traffic flowing;
it is possible to predict, before the aircraft lands or during the ground rolling phase, the occupancy time of the runways, taxiways, or any other element of the airport domain, to inform the air traffic control and/or the ground control thereof, and therefore to enable the latter to anticipate potential ground circulation problems and to adapt the airport scheduling accordingly;
the airlines are able to improve predictions regarding the use of actuators, in particular of the engines (consumption while rolling on the ground) and brakes (estimation of the wear of the brakes, thereby affording advantages in terms of maintenance); and
in the case where the speed of the aircraft is controlled manually, it is possible to provide the pilot with an optimal speed profile PV to be followed, as well as with the speeds not to be exceeded, having regard to the aforesaid constraints.

The invention claimed is:

1. A method for aiding the piloting of an aircraft, comprising:
generating a speed profile which is associated with a ground rolling trajectory of the aircraft on an airport domain by carrying out the following steps:
a) receiving said ground rolling trajectory which comprises a series of successive elements of the airport domain, each element representing a distinct and delimited part of said airport domain;
b) entering, by an operator, first constraints relating to rolling of the aircraft on the airport domain;
c) automatically determining, for each of said elements of said ground rolling trajectory, a plurality of values of maximum speed by taking account of said first constraints, and automatically selecting a minimum value from among said plurality of values of maximum speed as a maximum speed associated with the corresponding element;
d) entering, by an operator, second constraints relating to the rolling of the aircraft on the airport domain, and which comprise at least time constraints, load factor constraints and jerk constraints;
e) automatically determining said speed profile which is suited to each element of the ground rolling trajectory and which complies with a set of the maximum speeds and second constraints by taking account of the maximum speeds automatically selected in step c) and of said second constraints, said speed profile providing a variation of longitudinal speed as a function of the time which elapses during the rolling of the aircraft along said ground rolling trajectory; and f) providing the automatically determined speed profile to a pilot aiding unit; and said pilot aiding unit using the provided speed profile to aid the piloting of the aircraft, wherein step c) further comprises adjusting said maximum speed for at least one of the elements of the ground rolling trajectory, as a function of required accelerations and decelerations, and wherein the adjusting of said maximum speed comprises:
if the length corresponding to the at least one element is not sufficient to attain a speed below the maximum speed corresponding to the at least one element during deceleration, adjusting the set of maximum speeds, beginning with a maximum seed at the end of the ground rolling trajectory and backtracking to the at least one element, and if the length corresponding to the at least one element is not sufficient to attain a speed above the maximum speed corresponding to the at least one element during acceleration, adjusting the set of maximum speeds, beginning with the maximum speed at the at least one element and going through the maximum speed at the end of the ground rolling trajectory.

2. The method as claimed in claim 1, wherein step e) further comprises configuring said speed profile so as to obtain a longitudinal speed variation as a function of the position (s) of the aircraft, which is expressed in the form of a normed curvilinear abscissa, along said ground rolling trajectory.

3. The method as claimed in claim 1,
wherein step c) further comprises automatically selecting a speed which is a minimum from among at least said following speeds as the maximum speed associated with the corresponding element of the ground rolling trajectory:
an admissible maximum speed while turning so as to ensure comfort of passengers of the aircraft;
a maximum yaw rate that is supported by the aircraft;
a regulatory speed in a straight line;
a regulatory speed while turning;
a maximum speed complying with admissible load limits on various landing gear of the aircraft; and
a maximum speed dependent on a grip of tires of the aircraft.

4. The method as claimed in claim 1,
wherein step e) further comprises, for each element of the ground rolling trajectory:
determining switching times which define time intervals, during which a given equation is considered;
calculating speed variations between the various successive switching times; and
constructing the speed profile corresponding to the element of the ground rolling trajectory, taking account of said speed variations and said switching times.

5. The method as claimed in claim 1,
wherein step e) further comprises taking into account at least one time constraint to determine said speed profile, the at least one time constraint defining a particular time at which the aircraft passes a particular point of said ground rolling trajectory.

6. The method as claimed in claim 1, wherein step e) further comprises taking into account a response time of engines of the aircraft, following a speed control, to determine said speed profile.

7. The method as claimed in claim 1, further comprising predicting at least one of the following predictions for said ground rolling trajectory:
a prediction of travel time;
a prediction of distance traveled; and
a prediction of energy stored in brakes of the aircraft, as well as a temperature at a destination.

8. A method for aiding the piloting of an aircraft, comprising:
generating a speed profile which is associated with a ground rolling trajectory of the aircraft on an airport domain by carrying out the following steps:
a) receiving said ground rolling trajectory which comprises a series of successive elements of the airport domain, each element representing a distinct and delimited part of said airport domain;
b) entering, by an operator, first constraints relating to rolling of the aircraft on the airport domain;
c) automatically determining, for each of said elements of said ground rolling trajectory, a plurality of values of maximum speed by taking account of said first constraints, and automatically selecting a minimum value from among said plurality of values of maximum speed as a maximum speed associated with the corresponding element;
d) entering, by an operator, second constraints relating to the rolling of the aircraft on the airport domain, and which comprise at least time constraints, load factor constraints and jerk constraints;
e) automatically determining said speed profile which is suited to each element of the ground rolling trajectory and which complies with a set of the maximum speeds and second constraints by taking account of the maximum speeds automatically selected in step c) and of said second constraints said speed profile providing a variation of longitudinal speed as a function of the time which elapses during the rolling of the aircraft along said ground rolling trajectory; and
f) providing the automatically determined speed profile to a pilot aiding unit; and
said pilot aiding unit using the provided speed profile to aid the piloting of the aircraft,
wherein step c) further comprises adjusting said maximum speed for at least one of the elements of the ground rolling trajectory, as a function of required accelerations and decelerations, and
wherein the adjusting of said maximum speed comprises:
if the length corresponding to the at least one element is not sufficient to attain a speed below the maximum speed corresponding to the at least one element during deceleration, adjusting the set of maximum speeds, beginning with a maximum speed at the end of the ground rolling trajectory and backtracking to the at least one element, and
if the length corresponding to the at least one element is not sufficient to attain a speed above the maximum speed corresponding to the at least one element during acceleration, adjusting the set of maximum speeds, beginning with the maximum speed at the at least one element and going through the maximum speed at the end of the ground rolling trajectory, and
wherein step e) further comprises, in the absence of a time constraint, taking into account a cost index to determine said speed profile, said cost index making a compromise between a maximum speed on each element of the ground rolling trajectory and a limitation of use of engines and brakes of the aircraft.

9. The method as claimed in claim 8, wherein:
the cost index comprises a value between 0, which corresponds to a minimum use of actuators, and 1, which corresponds to a minimum occupancy time of a taxiway;
when the value is 0, the method further comprises calculating switching times such that at the end of deceleration, the aircraft is exactly at the end of the last element of the ground rolling trajectory; and
when the value is 1, the method further comprises directly attaining a maximum speed of a final plateau by an acceleration or a deceleration, without constructing a complete type profile.

10. The method as claimed in claim 8, wherein:
the cost index comprises a value between 0, which corresponds to a minimum use of actuators, and 1, which corresponds to a minimum occupancy time of a taxiway;
when the value is 1, the method further comprises keeping an admissible speed envelope unchanged, such that the speed profile to be followed fulfills the admissible speed envelope precisely; and
when the value is 0, the method further comprises modifying the admissible speed envelope so as to limit the use of the actuators.

11. A system for aiding the piloting of an aircraft, said system comprising:
a device for generating a speed profile which is associated with a ground rolling trajectory of the aircraft on an airport domain, said device comprising:
a trajectory receiving unit for receiving said ground rolling trajectory which comprises a series of successive elements of the airport domain, each element representing a distinct and delimited part of said airport domain;
a first input unit configured to enable an operator to input first constraints relating to rolling of the aircraft on the airport domain;
a maximum speed determining unit for automatically determining, for each of said elements of said ground rolling trajectory, a plurality of values of maximum speed by taking account of said input first constraints, and for automatically selecting, as a maximum speed associated with each corresponding element, a minimum value from among said plurality of values of maximum speed;
a second input unit configured to enable the operator to input second constraints relating to the rolling of the aircraft on the airport domain, said second constraints comprising at least time constraints, load factor constraints and jerk constraints;
a speed profile determining unit for automatically determining, by taking account of said maximum speeds and of said second constraints, said speed profile which is suited to each element of the trajectory and which complies with a set of the maximum speeds and second constraints, said speed profile providing a variation of longitudinal speed as a function of time which elapses during the rolling of the aircraft along said ground rolling trajectory; and
a speed profile transmitting unit for transmitting the automatically determined speed profile to a pilot aiding unit; wherein
said pilot aiding unit uses said speed profile received from said device, to aid the piloting of the aircraft, and
wherein the maximum speed determining unit further adjusts said maximum speed for at least one of the elements of the ground rolling trajectory, as a function of required accelerations and decelerations, such that:
if the length corresponding to the at least one element is not sufficient to attain a speed below the maximum speed corresponding to the at least one element during deceleration, the maximum speed determining unit adjusts the set of maximum speeds, beginning with a maximum speed at the end of the ground rolling trajectory and backtracking to the at least one element, and
if the length corresponding to the at least one element is not sufficient to attain a speed above the maximum speed corresponding to the at least one element during acceleration, the maximum speed determining unit adjusts the set of maximum speeds, beginning with the maximum speed at the at least one element and going through the maximum speed at the end of the ground rolling trajectory.

* * * * *